United States Patent
Anders et al.

(10) Patent No.: US 11,487,783 B2
(45) Date of Patent: Nov. 1, 2022

(54) CLONE DATA OBJECT AND SOFTWARE GENERATION

(71) Applicant: INTERNATIONAL BUSINESS MACHINES CORPORATION, Armonk, NY (US)

(72) Inventors: Kelley Anders, East New Market, MD (US); Jeremy R. Fox, Georgetown, TX (US); Jonathan Dunne, Dungarvan (IE); Ping Xiao, Beijing (CN)

(73) Assignee: International Business Machines Corporation, Armonk, NY (US)

(*) Notice: Subject to any disclaimer, the term of this patent is extended or adjusted under 35 U.S.C. 154(b) by 664 days.

(21) Appl. No.: 16/169,299

(22) Filed: Oct. 24, 2018

(65) Prior Publication Data
US 2020/0134078 A1    Apr. 30, 2020

(51) Int. Cl.
*G06F 16/27* (2019.01)

(52) U.S. Cl.
CPC .................................... *G06F 16/27* (2019.01)

(58) Field of Classification Search
CPC ................................ G06F 16/27; H04L 67/306
See application file for complete search history.

(56) References Cited

U.S. PATENT DOCUMENTS

| | | | |
|---|---|---|---|
| 9,037,649 B2 | 5/2015 | Gold | |
| 9,159,058 B2* | 10/2015 | Fleishman | G06Q 20/108 |
| 9,218,610 B2* | 12/2015 | Kandregula | G06K 19/06103 |
| 9,400,965 B2* | 7/2016 | Softer | G06Q 10/06316 |
| 9,442,778 B2 | 9/2016 | Desai | |
| 9,692,815 B2 | 6/2017 | Caldwell | |
| 9,852,417 B2* | 12/2017 | Tyler | G06Q 20/3274 |
| 9,947,005 B2* | 4/2018 | Smith | G06Q 20/3276 |
| 2011/0313921 A1* | 12/2011 | Dheer | G06Q 20/223 705/42 |
| 2013/0233916 A1* | 9/2013 | Tran | G06F 16/00 235/375 |
| 2014/0085309 A1* | 3/2014 | Czapar | G06F 3/147 345/441 |
| 2014/0201760 A1 | 7/2014 | Kraljic | |

(Continued)

FOREIGN PATENT DOCUMENTS

WO       20160630921 A1     4/2016

OTHER PUBLICATIONS

Mell, Peter et al.; "The NIST Definition of Cloud Computing;" National Institute of Standards and Technology; Special Publication 800-145; Sep. 2011; 7 pages.

*Primary Examiner* — Miranda Le
(74) *Attorney, Agent, or Firm* — Schmeiser, Olsen & Watts, LLP; Michael O'Keefe

(57) ABSTRACT

A method and system for improving memory reorganization and storage technology is provided. The method includes configuring data capture settings of a database system resulting in configured data capture settings. Data objects associated with a user are retrieved and stored in a database. Overlapping data elements of the data objects are determined and associated collaboration data model software code is generated. A request for first data is received and mapped to the data objects. A clone data object associated with the first data object is generated with respect to the overlapping data elements.

13 Claims, 11 Drawing Sheets

(56) References Cited

U.S. PATENT DOCUMENTS

| | | | |
|---|---|---|---|
| 2015/0161417 A1* | 6/2015 | Kaplan | G06Q 30/0234 |
| | | | 235/380 |
| 2015/0178721 A1* | 6/2015 | Pandiarajan | G06K 19/06037 |
| | | | 705/75 |
| 2015/0269331 A1* | 9/2015 | Bolanos | G16Z 99/00 |
| | | | 705/51 |
| 2017/0134167 A1* | 5/2017 | Carter | H04L 9/3226 |
| 2018/0011678 A1 | 1/2018 | Shipper | |

* cited by examiner

CLONE DATA OBJECT AND SOFTWARE GENERATION

FIELD

The present invention relates generally to a method for organizing computer storage and in particular to a method and associated system for improving memory storage technology associated with generating clone data objects and associated software code for access by multiple software applications.

BACKGROUND

Accurately sharing specified information typically includes an inaccurate process with little flexibility. Determining software based information solutions with respect to access by multiple applications may include a complicated process that may be time consuming and require a large amount of resources. Accordingly, there exists a need in the art to overcome at least some of the deficiencies and limitations described herein above.

SUMMARY

A first aspect of the invention provides a memory reorganization and storage improvement method comprising: configuring, by a processor of a database hardware controller, data capture settings of a database system resulting in configured data capture settings; retrieving from a plurality of remotely located data sources, by the processor in accordance with the configured data capture settings, data objects associated with a user; storing, by the processor, the data objects within a database; determining, by the processor in response to analyzing the data objects, overlapping data elements of the data objects; generating, by the processor based on the overlapping data elements, collaboration data model software code; receiving, by the processor from the user, a request for first data; mapping, by the processor executing the collaboration data model software code, the request with the data objects; and generating, by the processor executing the collaboration data model software code, a clone data object associated with the first data with respect to the overlapping data elements.

A second aspect of the invention provides a computer program product, comprising a computer readable hardware storage device storing a computer readable program code, the computer readable program code comprising an algorithm that when executed by a processor of a database hardware controller implements a memory reorganization and storage improvement method, the method comprising: configuring, by the processor, data capture settings of a database system resulting in configured data capture settings; retrieving from a plurality of remotely located data sources, by the processor in accordance with the configured data capture settings, data objects associated with a user; storing, by the processor, the data objects within a database; determining, by the processor in response to analyzing the data objects, overlapping data elements of the data objects; generating, by the processor based on the overlapping data elements, collaboration data model software code; receiving, by the processor from the user, a request for first data; mapping, by the processor executing the collaboration data model software code, the request with the data objects; and generating, by the processor executing the collaboration data model software code, a clone data object associated with the first data with respect to the overlapping data elements.

A third aspect of the invention provides a database hardware controller comprising a processor coupled to a computer-readable memory unit, the memory unit comprising instructions that when executed by the computer processor implements a memory reorganization and storage improvement method comprising: configuring, by the processor, data capture settings of a database system resulting in configured data capture settings; retrieving from a plurality of remotely located data sources, by the processor in accordance with the configured data capture settings, data objects associated with a user; storing, by the processor, the data objects within a database; determining, by the processor in response to analyzing the data objects, overlapping data elements of the data objects; generating, by the processor based on the overlapping data elements, collaboration data model software code; receiving, by the processor from the user, a request for first data; mapping, by the processor executing the collaboration data model software code, the request with the data objects; and generating, by the processor executing the collaboration data model software code, a clone data object associated with the first data with respect to the overlapping data elements.

The present invention advantageously provides a simple method and associated system capable of accurately sharing specified information.

DETAILED DESCRIPTION

Figure 1:
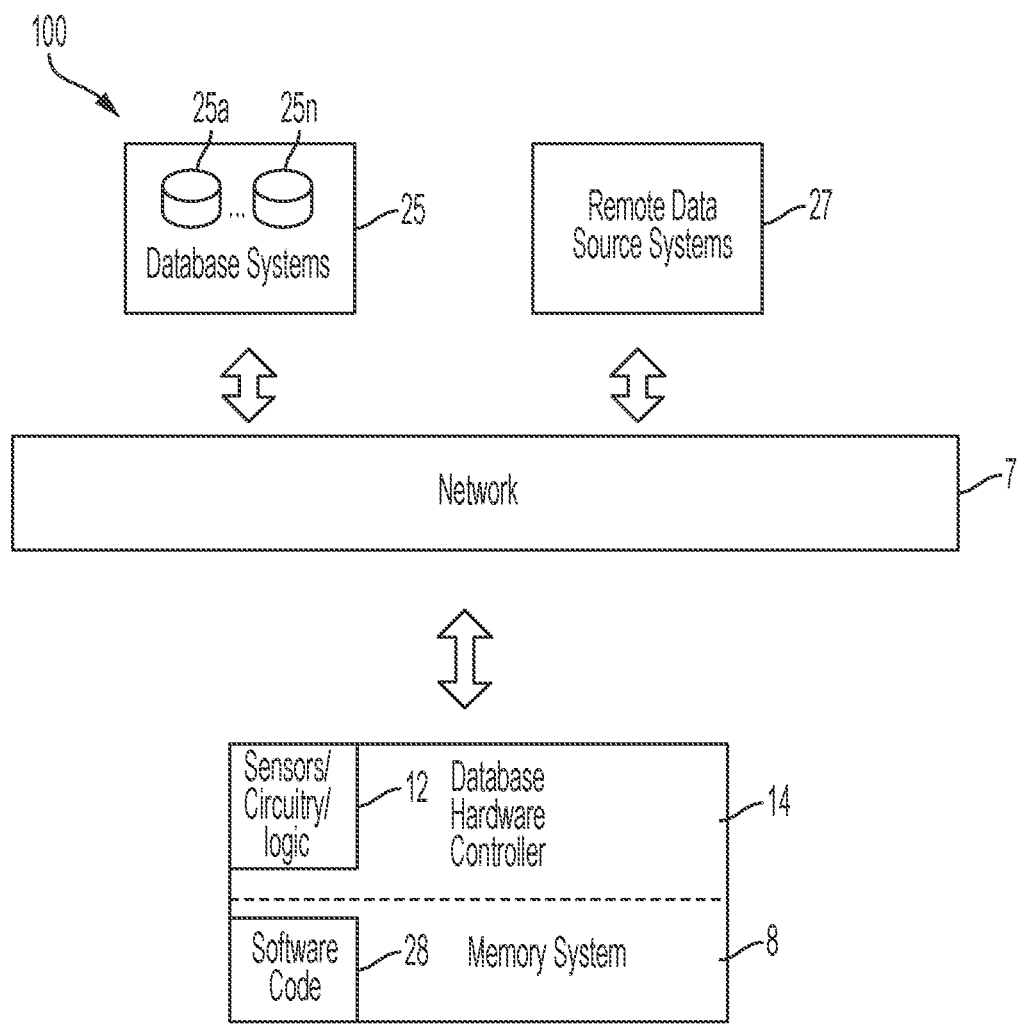
FIG. 1 illustrates a system for improving memory storage technology associated with generating clone data objects and associated software code for access by multiple software applications, in accordance with embodiments of the present invention.

FIG. 1 illustrates a system 100 for improving memory storage technology associated with generating clone data objects and associated software code for access by multiple software applications, in accordance with embodiments of the present invention. System 100 is enabled to execute a process for collaborating software applications for aggregating and sharing user data between the software applications for processing a task or transaction. Additionally, system 100 executes a process for identifying references disclosing a feature for deriving a collaboration data model (CDM) for identifying a request of a user and generating known and overlapping group data. System 100 enables the following process for generating a CDM:

The process is initiated when software is generated for obtaining data from a variety of disparate sources. The data is retrieved and reorganized (e.g., modeled) into a multi-dimensional array for deriving application requirements with respect to specific combinations) of data. Likewise, an analysis process is executed with respect to collaboration requests for requested and received data. In response to the analysis, a CDM is generated for identifying a request from a user and generating known and overlapping group data. Subsequently, a clone of the CDM is generated. The clone is configured to associate the data with a request type for future use. Additionally, clone may be temporarily shared with additional systems via a caching structure.

System 100 of FIG. 1 includes a database hardware controller 14, database systems 25, and remote data source systems 27 interconnected through a network 7. Database hardware controller 14 comprises sensors/circuitry/logic 12 and a (specialized) memory system 8. Memory system 8 comprises software code 28 including executable code. Memory system 8 may include a single memory system. Alternatively, memory system 8 may include a plurality of memory systems. Database hardware controller 14, database systems 25, and remote data source systems 27 each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, database hardware controller 14, database systems 25, and remote data source systems 27 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-11. The specialized discrete non-generic analog, digital, and logic-based circuitry (e.g., sensors/circuitry/logic 12, etc.) may include proprietary specially designed components (e.g., a specialized integrated circuit, such as for example an Application Specific Integrated Circuit (ASIC) designed for only implementing an automated process for improving memory storage technology associated with generating clone data objects and associated software code for access by multiple software applications. Sensors/circuitry/logic 12 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 7 may include any type of network including, inter alia, a local area network, (LAN), a wide area network (WAN), the Internet, a wireless network, etc.

System 100 enables the following process for sharing information between software applications based on a detected collaboration mode:

The process is executed by system 100 configured to collect and group a user's personal data items and present an associated group of data items based on a context of the data items. Personal data items that may be collected, shared, or pasted into forms are defined. For example, personal data items may include: an ID number, a phone number, a home address, a birthday, account numbers, URLs, photos, etc. Additionally, a source providing the personal data items may be defined. For example, source may include systems, applications, pages or fields within the applications, etc. The data items may be grouped based on, inter alia, an application, a context (e.g., a form name, requested information, etc.), a data requestor, specified data items entered within a short timeframe, etc. Multiple differing grouped data items may comprise common items such as ID number appearing in several groups, etc. User personal data may be requested by or transmitted to another user. For example, a userA may ask a userB to transfer money to userB's bank account. In response, userA may create a temporary personal data item group with required data items (e.g., bank name, bank account, amount, etc.) and transmit a link for the temporary data item group to userB for use. The link may comprise a QR code. Additionally, the link may comprise a short expiration date such that the temporary data group may be deleted after a short interval. Alternatively, a temporary personal data item group may be created based on an analysis of message text. For example, if userA receives a message from userB stating that userB wants to send userA a package, the system may automatically create a temporary data set comprising userA's address info and send a link to userB.

Figure 2:
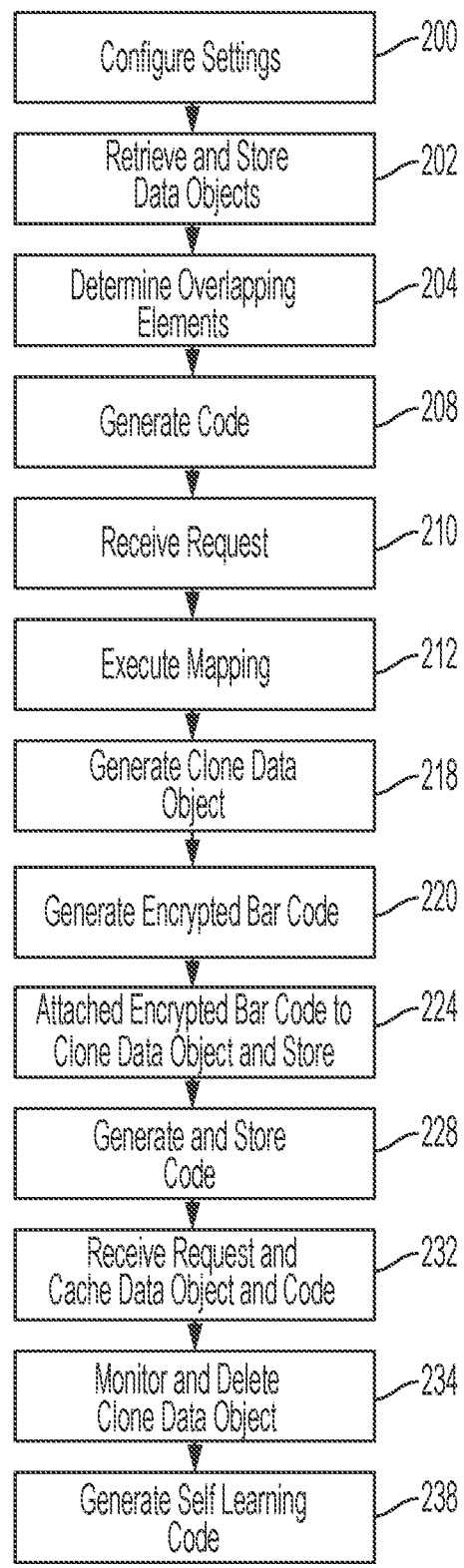
FIG. 2 illustrates an algorithm detailing a process flow enabled by the system of FIG. 1 for improving memory storage technology associated with generating clone data objects and associated software code for access by multiple software applications, in accordance with embodiments of the present invention.

FIG. 2 illustrates an algorithm detailing a process flow enabled by system 100 of FIG. 1 for improving memory storage technology associated with generating clone data objects and associated software code for access by multiple software applications, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by database hardware controller 14, database systems 25, and remote data source systems 27. In step 200, data capture settings of a database system are configured resulting in configured data capture settings. Defining data capture settings may include, inter alia, defining specified hardware and software sources for retrieving data objects. In step 202, data objects associated with a user are retrieved from a plurality of remotely located data sources in accordance with the configured data capture settings. The data objects are stored within a database. In step 204, overlapping data elements of the data objects are determined in response to analyzing the data objects. In step 208, collaboration data model software code is generated based on the overlapping data elements. In step 210, a request for first data is received. In step 212, the request is mapped with the data objects. In step 218, a clone data object associated with the first data with respect to the overlapping data elements is generated via execution of the collaboration data model software code. In step 220, an encrypted two-dimensional bar code is generated. The encrypted two-dimensional bar code includes an identification code and expiration date associated with the clone data object. In step 224, the encrypted two-dimensional bar code is attached to the clone data object. The clone data object comprising the encrypted two-dimensional bar code is stored within the database. In step 228, transactional software code associated with the user and the clone data object is generated and stored within the database. In step 232, a request for temporarily using the clone data object and the transactional software code is received. In response, the clone data object and the transactional software code are transmitted to a caching device. In step 234, the clone data object and said transactional software code are deleted (based on an elapsed time period) said such that all elements of the clone data object and the transactional software code are removed from all software and hardware elements of database and database hardware controller. Alternatively, the clone data object comprising the encrypted two dimensional bar code is monitored via a plurality of sensors and (based on results of the monitoring) it is determined that the expiration date has elapsed. Subsequently, the clone data object and said transactional software code are deleted (based on an elapsed time period) said such that all elements of the clone data object and the transactional software code are removed from all software and hardware elements of database and database hardware controller. In step 238, self-learning software code for executing future processes associated with executing the aforementioned algorithm is generated.

FIGS. 3-8 illustrate an implementation example enabled by system 100 of FIG. 1 for implementing the algorithm of FIG. 2, in accordance with embodiments of the present invention.

Figure 3:
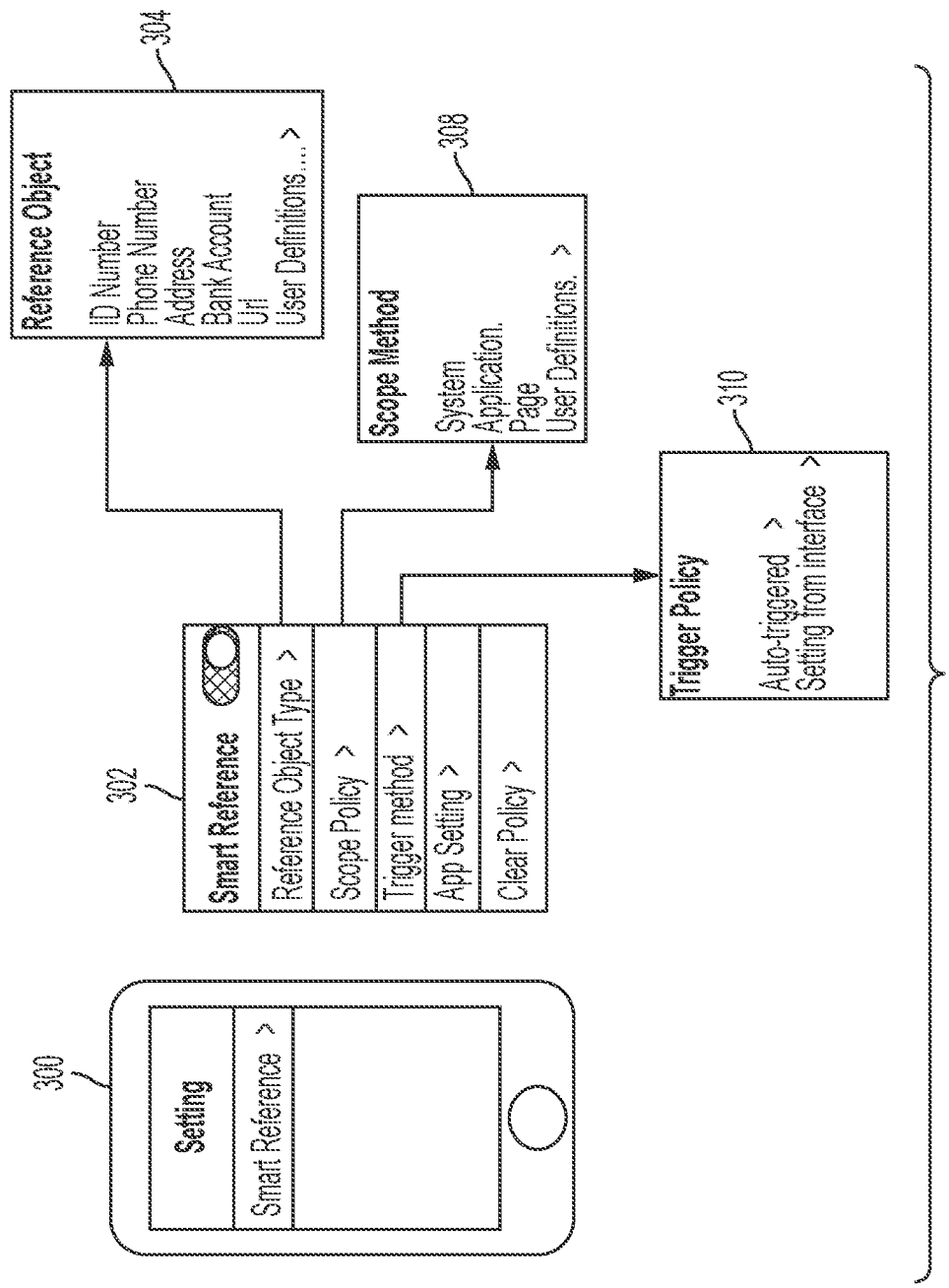
FIGS. 3-8 illustrate an implementation example enabled by the system of FIG. 1 for implementing the algorithm of FIG. 2, in accordance with embodiments of the present invention.

FIG. 3 illustrates step 200 of the algorithm of FIG. 2 for configuring data capture settings of a database system. The data capture settings are configured using a mobile hardware device 300. The mobile hardware device 300 comprises a graphical user interface (GUI) 302 for initializing a collection engine implemented process for determining a reference object 304, a scope method 308, and a trigger policy 310.

Figure 4:
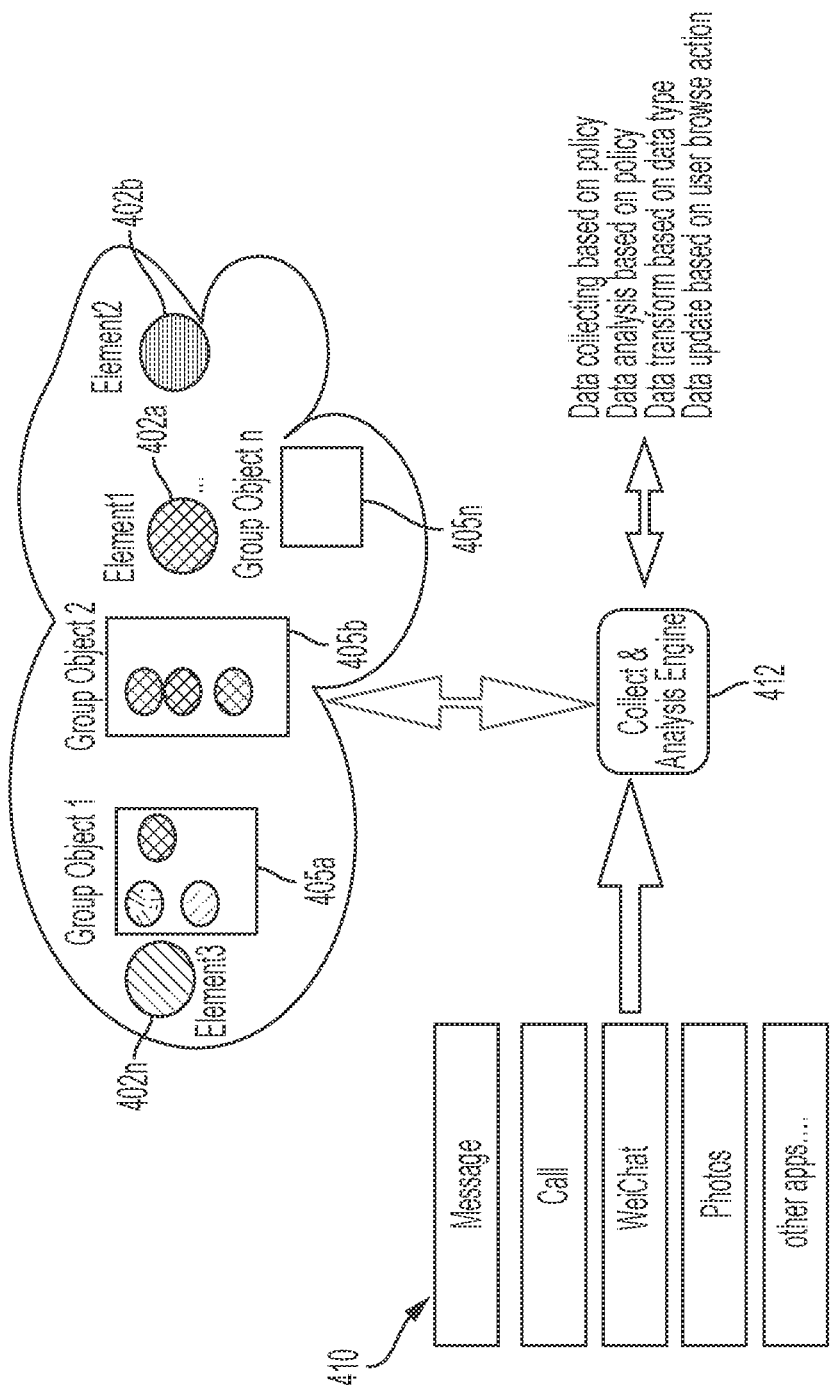

FIG. 4 illustrates step 202 of the algorithm of FIG. 2 for storing elements 402a . . . 402n and group objects 405a . . . 405n. Element 402a . . . 402n are scattered and comprise specific information such as, inter alia, an ID number, a telephone number, etc. A group object (e.g., group objects 405a . . . 405n) is combined from multiple data sources 410 for data entry into an application. For example, with respect to a ticket purchase, a group object may include an ID number, a credit card number, etc. Data may be updated (via an analysis engine) based on a user action or an automated action.

Figure 5:
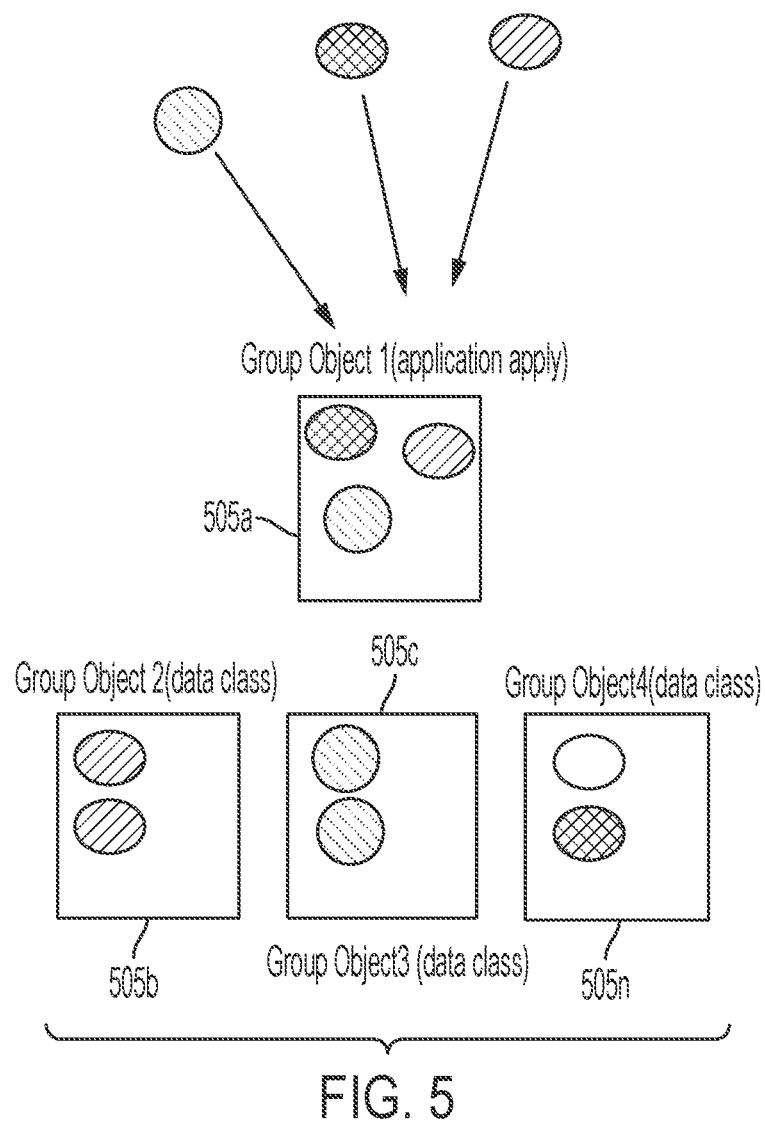

FIG. 5 further illustrates step 202 of the algorithm of FIG. 2 for storing group objects. Group objects 505a . . . 505n are generated based on the following attributes:
1. Group objects 505a . . . 505n are collected from a same Web page/application.
2. Group objects 505a . . . 505n are reused for a same/similar application in the future.
3. Group objects 505a . . . 505n are collected from the same person.
4. Group objects 505a . . . 505n are reused when a communication occurs with a same person.
5. Group objects 505a . . . 505n are collected at a same time.
6. Group objects 505a . . . 505n are reused within a short time frame and are transferred into additional groups.

Properties for group objects 505a . . . 505n may include: a duration needed, a collected/update time, a user or application collecting the data, encryption properties, etc. For example, a user's phone number, birthday, credit card number, may be retrieved for a first group for application to first software. Likewise, the user's ID number, credit card number, telephone number, etc. may be retrieved for a second group for application to second software. Additionally, the user's ID number may be placed in a data class for an ID element.

Figure 6:
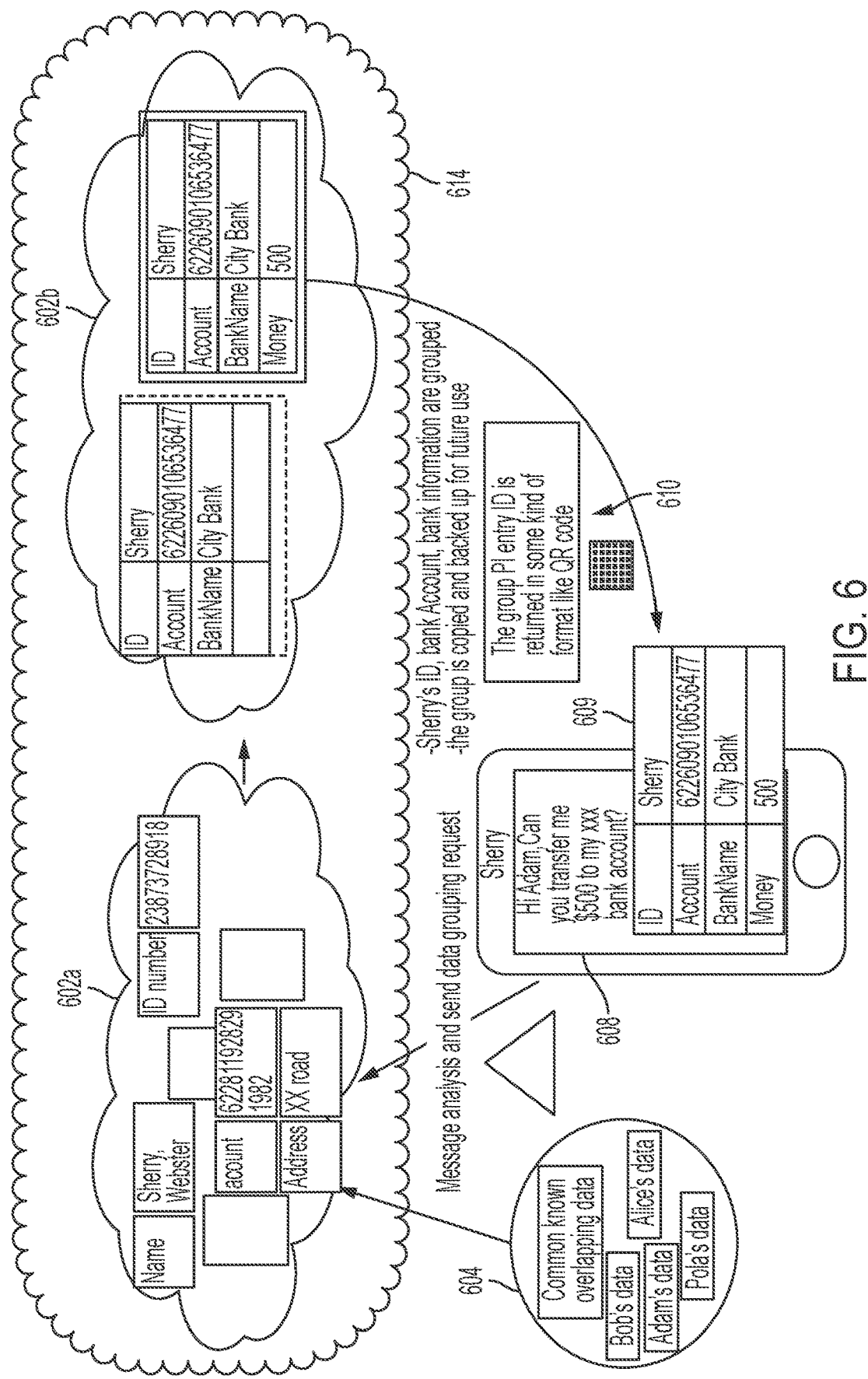

FIG. 6 illustrates an implementation example for generating reference data with respect to a collaborative mode for information sharing. The example illustrated in FIG. 6 is associated with a user (Sherry) submitting a request for a user (Adam) to transfer $500 from his account to her account. The process is initiated when Sherry transmits a message 608 with a reference engine 609. In response, the message is analyzed and transmitted to a centralized server 614 for requesting data grouping. The message is placed in a group 602a based on overlapping data 604. A copy of group 602a (i.e., group 602b) is saved for future use. Subsequently, a QR code 610 is generated and attached to message 608. QR code 610 comprises an expiration time such that information within group 602a will be deleted after usage.

Figure 7:
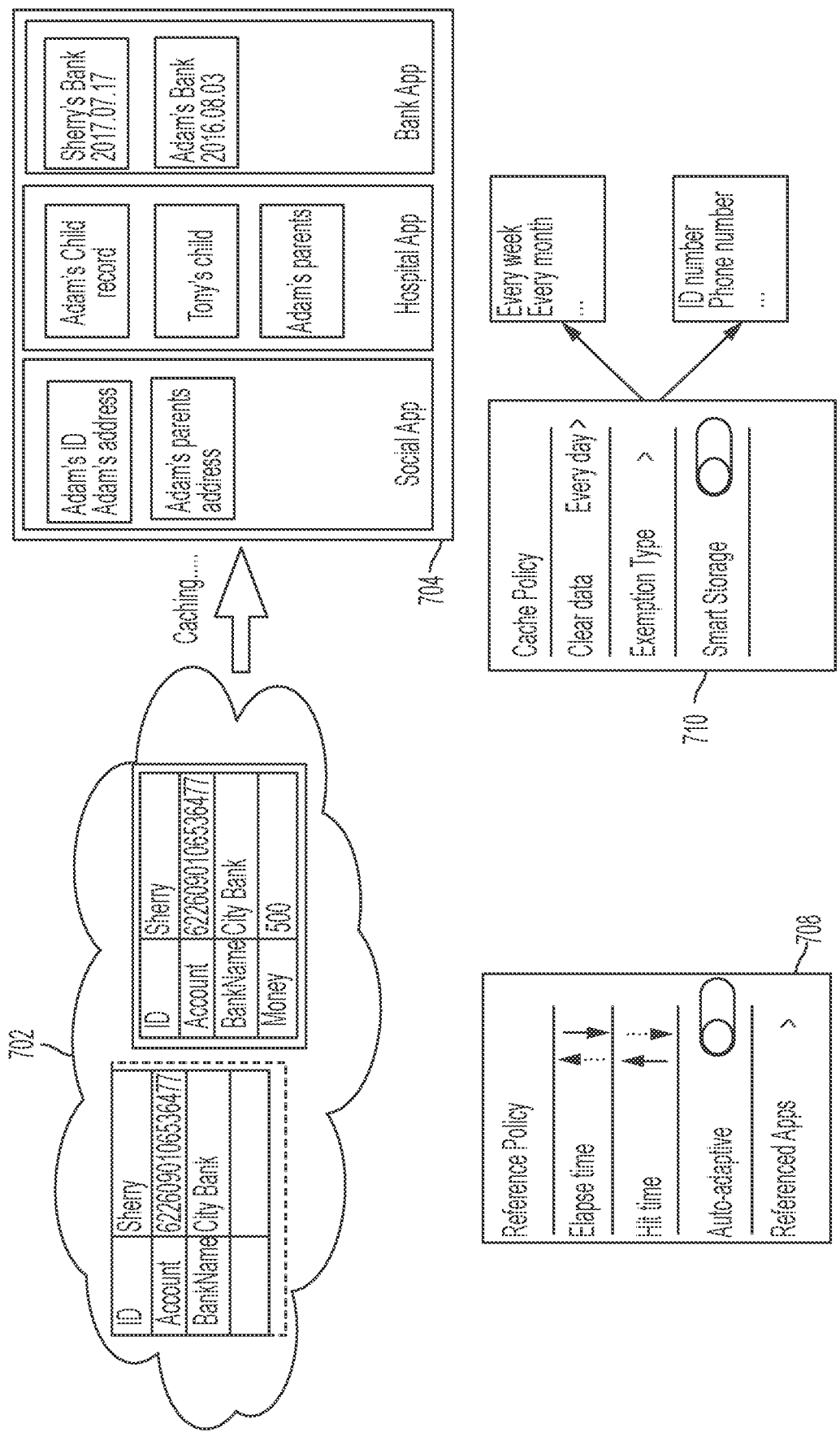

FIG. 7 illustrates maintenance and queuing process for cached data. Data 702 used for an application is transmitted to a cache 704 for a user Adam. In response, an automated interface 708 deploys differing policies to differing applications based on user operational properties. Additionally, a cache policy interface is configured to modify contents of cache 704.

Data capture settings are configured using a mobile hardware device 300. The mobile hardware device 300 comprises a graphical user interface (GUI) 302 for initializing a collection engine implemented process for determining a reference object 304, a scope method 308, and a trigger policy 310.

Figure 8:
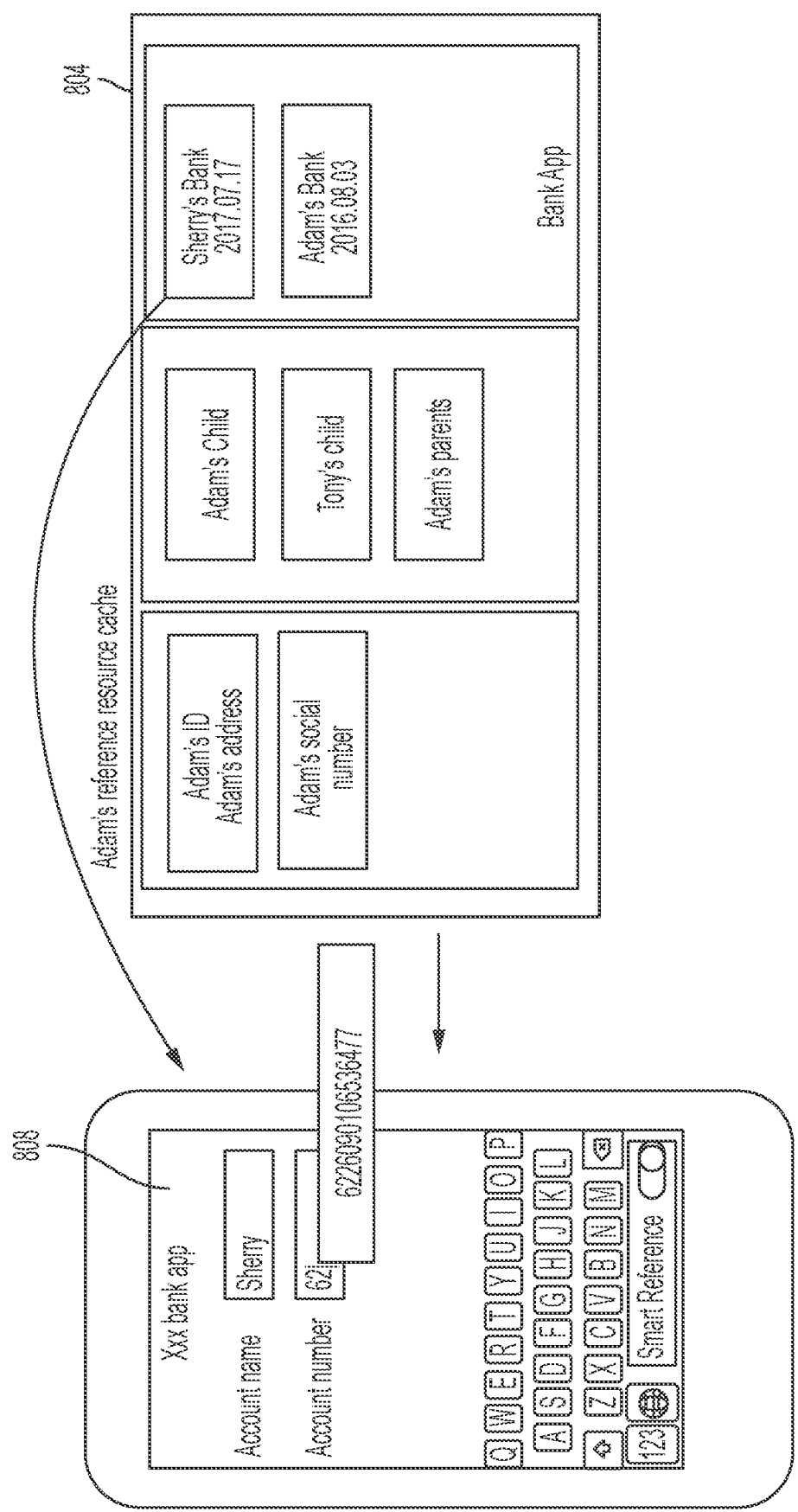

FIG. 8 illustrates referencing data within a cache 804. Information within the cache is retrieved from a GUI 808.

Figure 9:
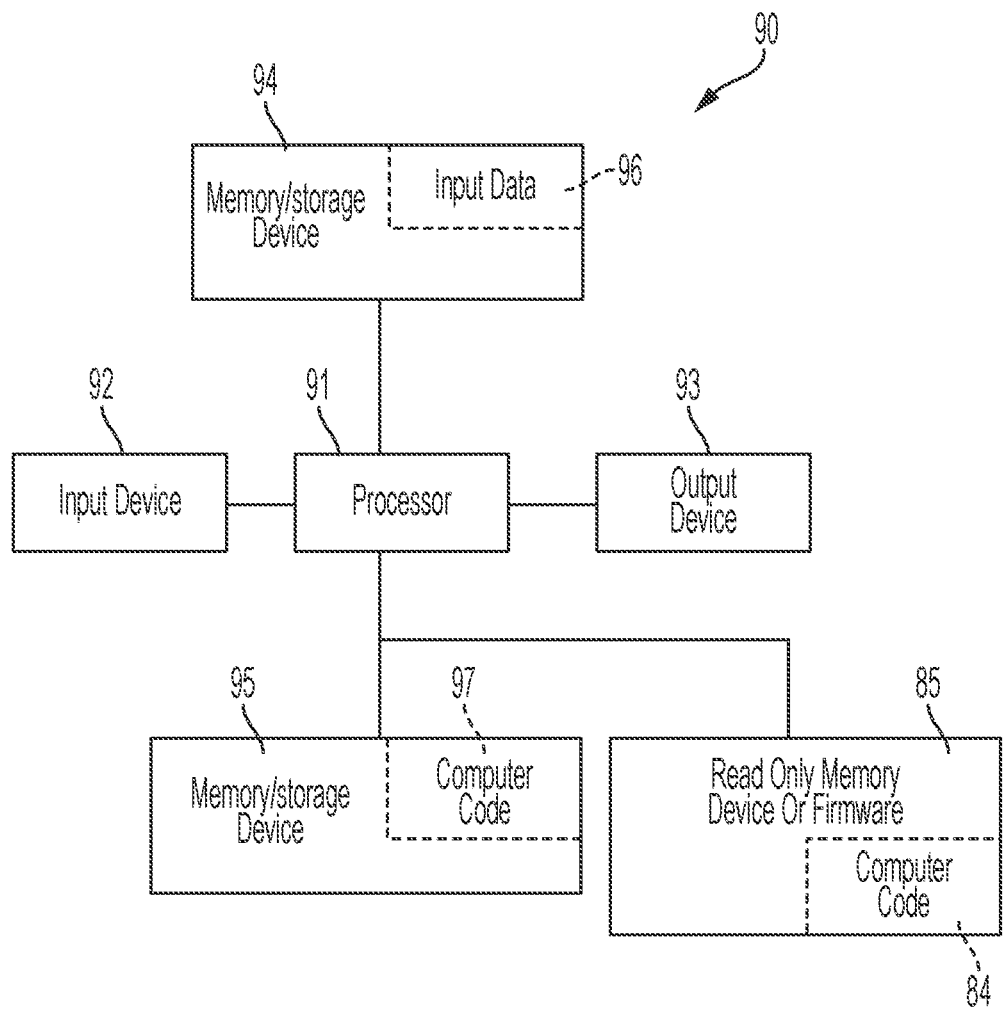
FIG. 9 illustrates a computer system used by the system of FIG. 1 for improving memory storage technology associated with generating clone data objects and associated software code for access by multiple software applications, in accordance with embodiments of the present invention.

FIG. 9 illustrates a computer system 90 (e.g., database hardware controller 14, database systems 25, and remote data source systems 27 of FIG. 1) used by or comprised by the system of FIG. 1 for improving memory storage technology associated with generating clone data objects and associated software code for access by multiple software applications, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 9 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving memory storage technology associated with generating clone data objects and associated software code for access by multiple software applications. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve memory storage technology associated with generating clone data objects and associated software code for access by multiple software applications. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving memory storage technology associated with generating clone data objects and associated software code for access by multiple software applications. In another embodiment, the invention provides a business method that performs the process steps of the invention on a subscription, advertising, and/or fee basis. That is, a service supplier, such as a Solution Integrator, could offer to enable a process for improving memory storage technology associated with generating clone data objects and associated software code for access by multiple software applications. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 9 shows the computer system 90 as a particular configuration of hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
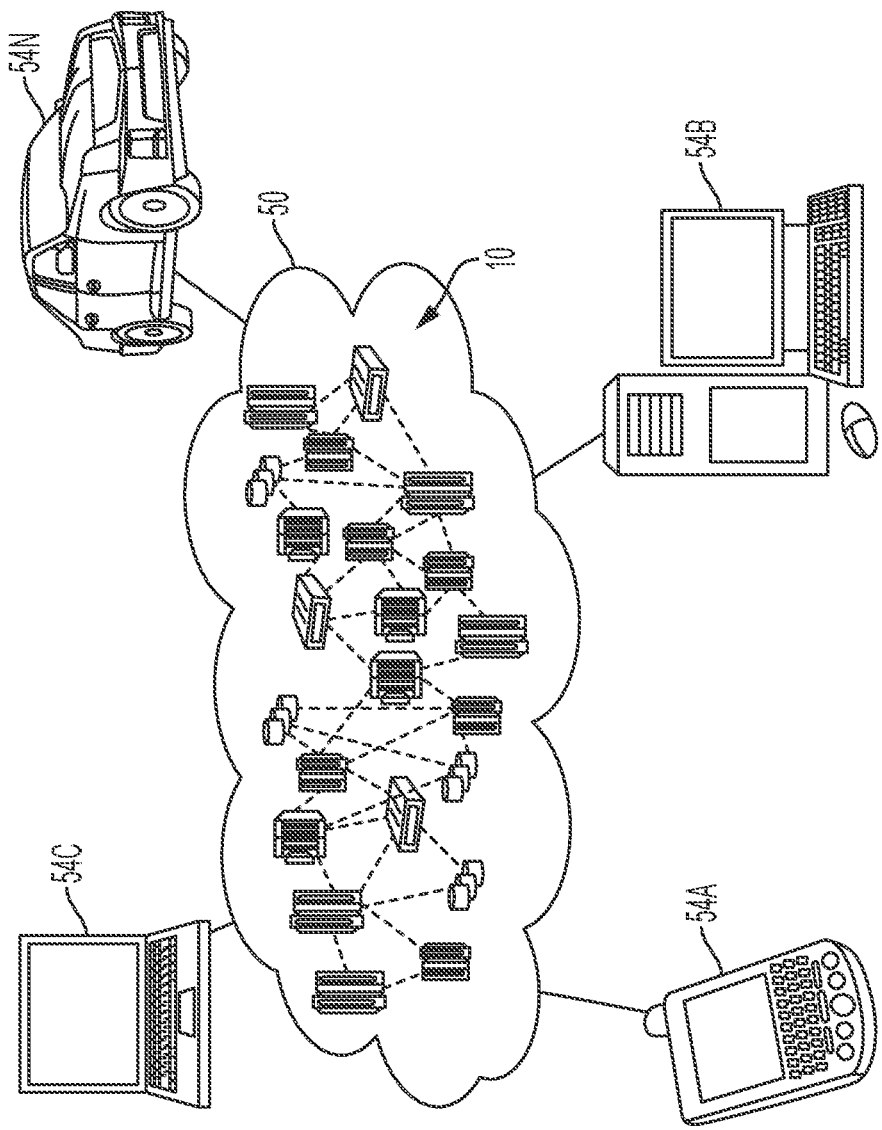
FIG. 10 illustrates a cloud computing environment, in accordance with embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 10 are intended to be illustrative only and that computing nodes 10 and cloud computing environment 50 can communicate with any type of computerized device over any type of network and/or network addressable connection (e.g., using a web browser).

Figure 11:
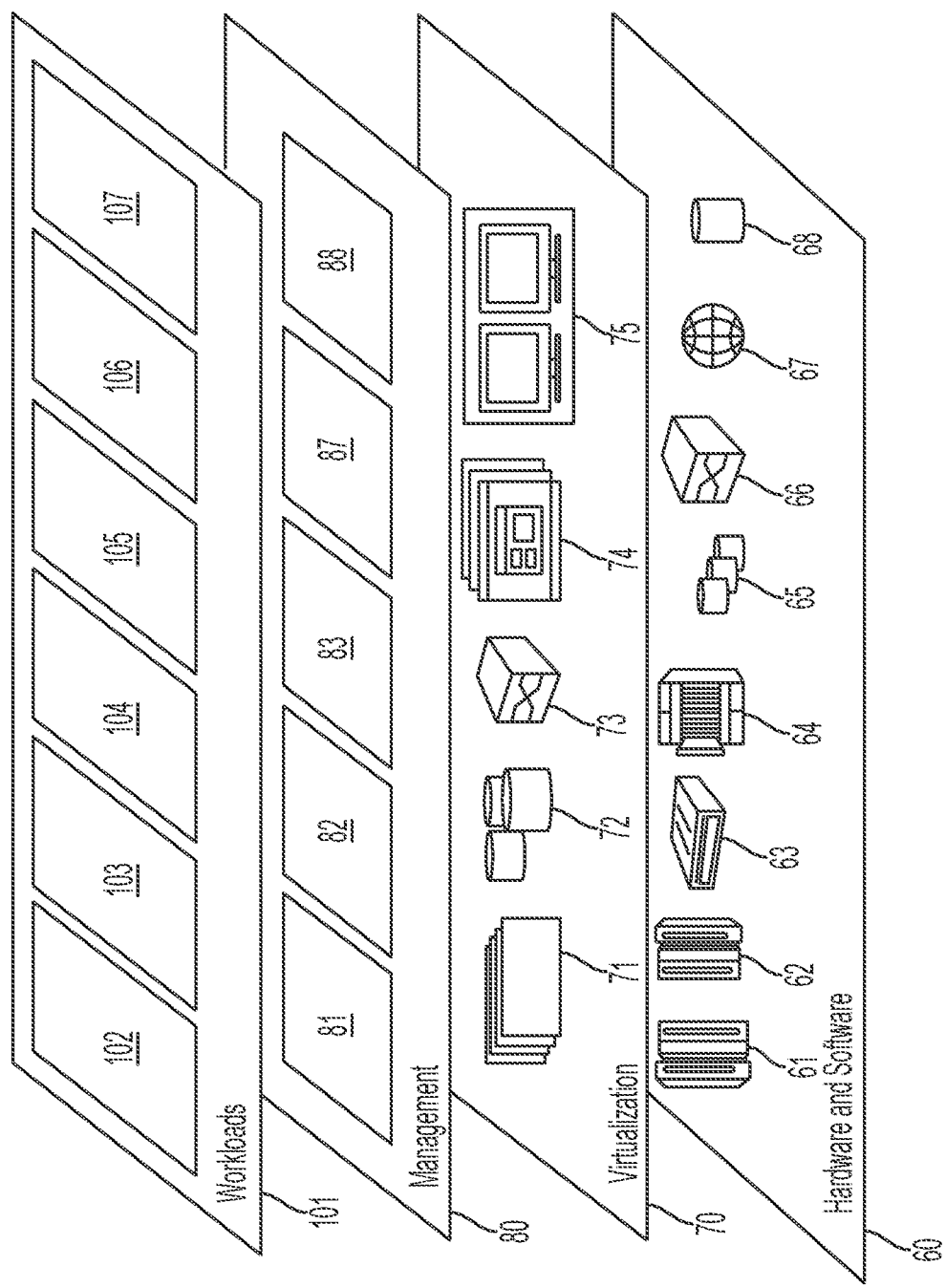
FIG. 11 illustrates a set of functional abstraction layers provided by cloud computing environment, in accordance with embodiments of the present invention.

Referring now to FIG. 11, a set of functional abstraction layers provided by cloud computing environment 50 (see FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for improving memory storage technology associated with generating clone data objects and associated software code for access by multiple software applications 108.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A memory reorganization and storage improvement method comprising:

capturing, by a processor of a database hardware controller executing a software application, data capture settings of a database system resulting in configured data capture settings;

defining, by said processor, hardware and software for retrieving data objects;

simultaneously retrieving from a plurality of remotely located data sources, by said processor in accordance with said configured data capture settings, said data objects associated with secure temporary transactions of a user, wherein said data objects are being reused with said software application at a future time and when communications with a same entity are detected;

storing, by said processor, said data objects within a database;

defining, by said processor, a software source providing said data objects;

reorganizing with respect to said software source, by said processor, said data objects into a multi-dimensional software array deriving software application requirements with respect to specific combinations of data of said data objects;

determining, by said processor in response to analyzing said data objects and results of said reorganizing, overlapping data elements of said data objects;

generating, by said processor based on said overlapping data elements, collaboration data model software code;

receiving, by said processor from said user, a request for first data;

mapping, by said processor executing said collaboration data model software code, said request with said data objects;

automatically generating in response to analysis of a text message structure received by said user, by said processor executing said collaboration data model software code, a clone data object associated with said first data with respect to said overlapping data elements;

detecting, by said processor, a collaboration mode associated with information sharing between said database hardware controller and specified software applications;
generating, by said processor, a link associated with retrieving said clone data object, wherein said link comprises an expiration date;
transmitting, by said processor via text message, said link to said user;
activating, by said processor in response to a command from said user, said link;
temporarily sharing within a time period of said expiration date, by said processor in response to results of said activating, said clone data object with additional hardware and software systems via a caching structure, wherein said caching structure is referenced by said user, via a mobile device and a GUI, based on a user address, user family members, and a user entity associated with said caching structure;
enabling, by said processor in response to activation of said clone data object, access by said user to software accounts of another user;
deleting after said expiration date has expired, by said processor, said clone data object and said transactional software code such that all elements of said clone data object and said transactional software code are removed from all software and hardware elements of said database and said database hardware controller;
generating, by said processor, an encrypted two-dimensional bar code comprising an identification code and expiration date associated with said clone data object;
attaching, by said processor, said encrypted two-dimensional bar code to said clone data object; and
storing, by said processor within said database, said clone data object comprising said encrypted two-dimensional bar code;
generating, by said processor, self learning software code for executing future processes associated with executing said memory reorganization and storage improvement method.

2. The method of claim 1, further comprising:
monitoring, by said processor via a plurality of sensors, said clone data object comprising said encrypted two-dimensional bar code;
determining, by said processor based on results of said monitoring, that said expiration date has elapsed; and
deleting, by said processor based on said determining that said expiration date has elapsed, said clone data object comprising said encrypted two-dimensional bar code such that all elements of said clone data object comprising said encrypted two-dimensional bar code are removed from all software and hardware elements of said database and said database hardware controller.

3. The method of claim 1, further comprising:
generating, by said processor, transactional software code associated with said user and said clone data object; and
storing, by said processor within said database, said clone data object and said transactional software code.

4. The method of claim 3, further comprising:
receiving, by said processor, a request for temporarily using said clone data object and said transactional software code; and
transmitting, by said processor to a caching device in response to said request, said clone data object and said transactional software code.

5. The method of claim 1, wherein said configuring said data capture settings comprises:
defining specified hardware and software sources for said retrieving said data objects.

6. The method of claim 1, further comprising:
providing at least one support service for at least one of creating, integrating, hosting, maintaining, and deploying computer-readable code in the control hardware, said code being executed by the computer processor to implement: said configuring, said retrieving, said storing, said determining, said generating said collaboration data model software code, said receiving, said mapping, and said generating said clone data object.

7. A computer program product, comprising a computer readable hardware storage device storing a computer readable program code, said computer readable program code comprising an algorithm that when executed by a processor of a database hardware controller implements a memory reorganization and storage improvement method, said method comprising:
capturing, by said processor executing a software application, data capture settings of a database system resulting in configured data capture settings;
defining, by said processor, hardware and software for retrieving data objects;
simultaneously retrieving from a plurality of remotely located data sources, by said processor in accordance with said configured data capture settings, said data objects associated with secure temporary transactions of a user, wherein said data objects are being reused with said software application at a future time and when communications with a same entity are detected;
storing, by said processor, said data objects within a database;
defining, by said processor, a software source providing said data objects;
reorganizing with respect to said software source, by said processor, said data objects into a multi-dimensional software array deriving software application requirements with respect to specific combinations of data of said data objects;
determining, by said processor in response to analyzing said data objects and results of said reorganizing, overlapping data elements of said data objects;
generating, by said processor based on said overlapping data elements, collaboration data model software code;
receiving, by said processor from said user, a request for first data;
mapping, by said processor executing said collaboration data model software code, said request with said data objects;
automatically generating in response to analysis of a text message structure received by said user, by said processor executing said collaboration data model software code, a clone data object associated with said first data with respect to said overlapping data elements;
detecting, by said processor, a collaboration mode associated with information sharing between said database hardware controller and specified software applications;
generating, by said processor, a link associated with retrieving said clone data object, wherein said link comprises an expiration date;
transmitting, by said processor via text message, said link to said user;
activating, by said processor in response to a command from said user, said link;

temporarily sharing within a time period of said expiration date, by said processor in response to results of said activating, said clone data object with additional hardware and software systems via a caching structure, wherein said caching structure is referenced by said user, via a mobile device and a GUI, based on a user address, user family members, and a user entity associated with said caching structure;

enabling, by said processor in response to activation of said clone data object, access by said user to software accounts of another user;

deleting after said expiration date has expired, by said processor, said clone data object and said transactional software code such that all elements of said clone data object and said transactional software code are removed from all software and hardware elements of said database and said database hardware controller;

generating, by said processor, an encrypted two-dimensional bar code comprising an identification code and expiration date associated with said clone data object;

attaching, by said processor, said encrypted two-dimensional bar code to said clone data object; and storing, by said processor within said database, said clone data object comprising said encrypted two-dimensional bar code;

generating, by said processor, self learning software code for executing future processes associated with executing said memory reorganization and storage improvement method.

8. The computer program product of claim 7, wherein said method further comprises:

monitoring, by said processor via a plurality of sensors, said clone data object comprising said encrypted two-dimensional bar code;

determining, by said processor based on results of said monitoring, that said expiration date has elapsed; and deleting, by said processor based on said determining that said expiration date has elapsed, said clone data object comprising said encrypted two-dimensional bar code such that all elements of said clone data object comprising said encrypted two-dimensional bar code are removed from all software and hardware elements of said database and said database hardware controller.

9. The computer program product of claim 7, wherein said method further comprises:

generating, by said processor, transactional software code associated with said user and said clone data object; and storing, by said processor within said database, said clone data object and said transactional software code.

10. The computer program product of claim 9, wherein said method further comprises:

receiving, by said processor, a request for temporarily using said clone data object and said transactional software code; and transmitting, by said processor to a caching device in response to said request, said clone data object and said transactional software code.

11. The computer program product of claim 7, wherein said configuring said data capture settings comprises:

defining specified hardware and software sources for said retrieving said data objects.

12. A database hardware controller comprising a processor coupled to a computer-readable memory unit, said memory unit comprising instructions that when executed by the computer processor implements a memory reorganization and storage improvement method comprising:

capturing, by said processor executing a software application, data capture settings of a database system resulting in configured data capture settings;

defining, by said processor, hardware and software for retrieving data objects;

simultaneously retrieving from a plurality of remotely located data sources, by said processor in accordance with said configured data capture settings, said data objects associated with secure temporary transactions of a user, wherein said data objects are being reused with said software application at a future time and when communications with a same entity are detected;

storing, by said processor, said data objects within a database;

defining, by said processor, a software source providing said data objects;

reorganizing with respect to said software source, by said processor, said data objects into a multi-dimensional software array deriving software application requirements with respect to specific combinations of data of said data objects;

determining, by said processor in response to analyzing said data objects and results of said reorganizing, overlapping data elements of said data objects;

generating, by said processor based on said overlapping data elements, collaboration data model software code;

receiving, by said processor from said user, a request for first data;

mapping, by said processor executing said collaboration data model software code, said request with said data objects;

automatically generating in response to analysis of a text message structure received by said user, by said processor executing said collaboration data model software code, a clone data object associated with said first data with respect to said overlapping data elements;

detecting, by said processor, a collaboration mode associated with information sharing between said database hardware controller and specified software applications;

generating, by said processor, a link associated with retrieving said clone data object, wherein said link comprises an expiration date;

transmitting, by said processor via text message, said link to said user;

activating, by said processor in response to a command from said user, said link;

temporarily sharing within a time period of said expiration date, by said processor in response to results of said activating, said clone data object with additional hardware and software systems via a caching structure, wherein said caching structure is referenced by said user, via a mobile device and a GUI, based on a user address, user family members, and a user entity associated with said caching structure;

enabling, by said processor in response to activation of said clone data object, access by said user to software accounts of another user;

deleting after said expiration date has expired, by said processor, said clone data object and said transactional software code such that all elements of said clone data object and said transactional software code are removed from all software and hardware elements of said database and said database hardware controller;

generating, by said processor, an encrypted two-dimensional bar code comprising an identification code and expiration date associated with said clone data object;

attaching, by said processor, said encrypted two-dimensional bar code to said clone data object; and storing, by said processor within said database, said clone data object comprising said encrypted two-dimensional bar code;

generating, by said processor, self learning software code for executing future processes associated with executing said memory reorganization and storage improvement method.

13. The database hardware controller of claim 12, wherein said method further comprises:

monitoring, by said processor via a plurality of sensors, said clone data object comprising said encrypted two-dimensional bar code;

determining, by said processor based on results of said monitoring, that said expiration date has elapsed; and deleting, by said processor based on said determining that said expiration date has elapsed, said clone data object comprising said encrypted two-dimensional bar code such that all elements of said clone data object comprising said encrypted two-dimensional bar code are removed from all software and hardware elements of said database and said database hardware controller.

\* \* \* \* \*